(12) United States Patent
Liu et al.

(10) Patent No.: US 8,549,286 B2
(45) Date of Patent: Oct. 1, 2013

(54) METHOD AND SYSTEM FOR FORWARDING DATA BETWEEN PRIVATE NETWORKS

(75) Inventors: Lifeng Liu, Chengdu (CN); Min Huang, Chengdu (CN); Shi Wan, Chengdu (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 364 days.

(21) Appl. No.: 12/915,430

(22) Filed: Oct. 29, 2010

(65) Prior Publication Data

US 2011/0040968 A1    Feb. 17, 2011

Related U.S. Application Data

(63) Continuation of application No. PCT/CN2009/071586, filed on Apr. 30, 2009.

(30) Foreign Application Priority Data

Apr. 30, 2008    (CN) .......................... 2008 1 0094439

(51) Int. Cl.
H04L 29/06    (2006.01)

(52) U.S. Cl.
USPC ............................ 713/162; 713/153; 713/201

(58) Field of Classification Search
USPC .................. 713/153, 201, 162; 370/401, 409
See application file for complete search history.

(56) References Cited

U.S. PATENT DOCUMENTS

| 7,280,540 | B2 * | 10/2007 | Halme et al. .................. 370/392 |
| 7,848,335 | B1 * | 12/2010 | Kang et al. .................... 370/401 |
| 7,962,743 | B2 * | 6/2011 | Fluhrer ........................ 713/153 |
| 2008/0043749 | A1 | 2/2008 | Suganthi et al. | |

FOREIGN PATENT DOCUMENTS

| CN | 1838638 | 9/2006 |
| CN | 101132420 | 2/2008 |
| CN | 101572643 B | 6/2011 |
| JP | 2004-229229 A | 8/2004 |

OTHER PUBLICATIONS

Office Action, mailed Sep. 13, 2010, in corresponding Chinese Application 200810094439.X (6 pp.).
Written Opinion of the International Searching Authority issued Aug. 13, 2009 in corresponding International Patent Application PCT/CN2009/071586.
International Search Report, mailed Aug. 13, 2009, in corresponding International Application No. PCT/CN2009/071586 (4 pp.).

* cited by examiner

*Primary Examiner* — Jeffrey Pwu
*Assistant Examiner* — William Corum, Jr.
(74) *Attorney, Agent, or Firm* — Staas & Halsey LLP

(57) ABSTRACT

In the field of communications technology, a method and a system for forwarding data between private networks are provided, which can enable terminals in different private networks to securely communicate with each other by using private network addresses. The method includes the following steps. A Secure Socket Layer (SSL) tunnel to an SSL Virtual Private Network (VPN) device in another private network is established. Address allocation information of the another private network is received through the SSL tunnel. The address allocation information and a mapping relation between the address allocation information and a public network IP address of the SSL VPN device transmitting the address allocation information and a session ID of the SSL tunnel transmitting the address allocation information are saved. A data packet whose destination address belongs to the another private network is forwarded to the SSL VPN device of the private network to which the destination address belongs, according to the address allocation information and the mapping relation. Through the method, the SSL VPN device can resolve private network addresses of other private networks.

7 Claims, 6 Drawing Sheets

METHOD AND SYSTEM FOR FORWARDING DATA BETWEEN PRIVATE NETWORKS

CROSS-REFERENCE TO RELATED APPLICATIONS

This application is a continuation of International Application PCT/CN2009/071586, filed on Apr. 30, 2009, which claims priority to Chinese Patent Application No. 200810094439.X, filed on Apr. 30, 2008, both of which are hereby incorporated by reference in their entireties.

FIELD OF THE TECHNOLOGY

The present invention relates to the field of communications technology, and more particularly to a method and an apparatus for sharing private network address allocation information, and a method and a system for forwarding data between private networks.

BACKGROUND OF THE INVENTION

In the global business environment, a large multinational enterprise may have subsidiary companies or branches all over the world. It is of great importance to remotely access internal resources of the enterprise in a secure and fast way. A Virtual Private Network (VPN) based on Secure Socket Layer (SSL) technology can ensure the security of remote access of a user to the network through the SSL, so that data can be transmitted as securely as in a private network. With the help of the SSL VPN technology, a user may access important enterprise applications through only a standard Web browser, so that an employee of the enterprise on a business trip may access enterprise resources using only a computer that accesses the Internet without carrying his/her own notebook computer. In this way, the efficiency of the enterprise is improved, and the problem of security is solved.

Currently, many institutions use SSL VPN devices to connect geographically or logically separated branch networks through a public network (such as the Internet). The SSL VPN devices are deployed at the edges between the branch networks and the public network. The SSL VPN devices have public network Internet Protocol (IP) addresses routable in the public network. Each of the branch networks uses a private network address, and all the private network addresses are allocated in a uniform way. Therefore, in the entire institution, the IP address of any branch network is different from the IP addresses of other branch networks. In this way, all terminals in the branch networks of the institution are "integrated" into an overall network.

For such an institution network, communication between private branch networks needs to be achieved, that is, data forwarding between a terminal with an allocated private network address in a branch and terminals in other branches needs to be achieved. Currently, because the SSL VPN device of each of the branches cannot resolve private network addresses of other branch networks, data to be forwarded cannot be encapsulated in a corresponding SSL tunnel to be sent to the SSL VPN device in the another branch network, where the destination address of the SSL VPN device corresponds to another branch network. To transmit communication data between private networks, a current solution used is to lease dedicated lines, that is, a private network, from an operator. Because a dedicated network can only be used by a leaser, the security of data and the bandwidth of the network can be effectively ensured.

However, in the implementation of the present invention, the inventors find that the prior art at least has the following problems: The deployment of a private network is complex, and such deployment requires great changes in the existing network device and structure. Therefore, the deployment of a private network cannot become a practical solution.

SUMMARY OF THE INVENTION

In one aspect, an embodiment of the present invention is directed to a method and an apparatus for sharing private network address allocation information, which enables an SSL VPN device of a private network to resolve private network addresses of other private networks.

In an embodiment, the present invention provides a method for sharing private network address allocation information. The method includes the following steps:

Address allocation information of another private network is received through an SSL tunnel. The address allocation information is saved, in which the address allocation information is used to judge whether a destination address of a data packet belongs to the another private network when the data packet is received.

In an embodiment, the present invention provides an apparatus for sharing private network address allocation information. The apparatus includes an address allocation information receiving unit and an address allocation information saving unit.

The address allocation information receiving unit is configured to receive address allocation information of another private network through an SSL tunnel. The address allocation information saving unit is configured to save the address allocation information received by the address allocation information receiving unit, in which the address allocation information is used to judge whether a destination address of a data packet belongs to the another private network when the data packet is received.

It can be seen from the preceding technical solutions that, address allocation information of another private network transmitted by an SSL VPN device in the another private network is received through an SSL tunnel, and the address allocation information is saved, so that an SSL VPN device of a private network obtains the allocation information of a private address of the another private network. Thus, it can be judged whether a destination address of a data packet belongs to the another private network according to the address allocation information when the data packet is received. Therefore, an SSL VPN device of a private network is enabled to achieve private network addresses resolution of other private networks.

In another aspect, the present invention is directed to a method and a system for forwarding data between private networks, which enables terminals in different private networks to securely communicate with each other by using private network addresses.

In an embodiment, the present invention provides a method for forwarding data between private networks. The method includes the following steps:

An SSL tunnel is established between an SSL VPN device in a private network and an SSL VPN device in another private network. Address allocation information of the another private network is received through the SSL tunnel, in which the address allocation information is transmitted by the SSL VPN device in the another private network through the SSL tunnel. The address allocation information and a mapping relation between the address allocation information and a public network IP address of the SSL VPN device transmitting the address allocation information and a session ID of the SSL tunnel transmitting the address allocation information are saved. A data packet whose destination address belongs to the another private network is forwarded to the SSL VPN device of the another private network, according to the address allocation information and the mapping relation.

In an embodiment, the present invention provides a system for forwarding data between private networks. The system includes two or more private networks. Each of the private networks accesses a public network through an SSL VPN device allocated with a public network IP address. Each of the SSL VPN devices includes an SSL tunnel establishing unit, an address allocation information receiving unit, a saving unit, and a data packet forwarding unit. The SSL tunnel establishing unit is configured to establish an SSL tunnel between an SSL VPN device in a private network and an SSL VPN device in another private network. The address allocation information receiving unit is configured to receive address allocation information of the another private network through the SSL tunnel established by the SSL tunnel establishing unit, in which the address allocation information is transmitted by the SSL VPN device in the another private network through the SSL tunnel. The saving unit is configured to save the address allocation information received by the address allocation information receiving unit and a mapping relation between the address allocation information and the public network IP address of the SSL VPN device transmitting the address allocation information and a session ID of the SSL tunnel transmitting the address allocation information. The data packet forwarding unit is configured to forward a data packet whose destination address belongs to the another private network to the SSL VPN device of the private network to which the destination address belongs, according to the address allocation information and the mapping relation saved by the saving unit.

It can be seen from the preceding technical solutions that, an SSL tunnel is established between an SSL VPN device in a private network and an SSL VPN device in another private network, address allocation information of the another private network transmitted by the SSL VPN device in the another private network through the SSL tunnel is received, and the address allocation information is saved, so that an SSL VPN device of a private network obtains the allocation information of a private address of the another private network. A mapping relation between the address allocation information and the public network IP address of the SSL VPN device transmitting the address allocation information and a session ID of the SSL tunnel transmitting the address allocation information is saved. For a data packet with a source address being a private network address and a destination address being a private IP address of the another private network, the mapping relation is queried according to the address allocation information to obtain the SSL VPN device corresponding to the public network IP address and the SSL tunnel corresponding to the session ID. Thus, the data packet can be forwarded to the SSL VPN device obtained by query. Therefore, terminals in different private networks are enabled to securely communicate with each other by using private network addresses.

BRIEF DESCRIPTION OF THE DRAWINGS

To make the technical solution of the present invention clearer, the accompanying drawings for illustrating the embodiments of the present invention or the prior art are described briefly below. The accompanying drawings are for the exemplary purpose only, and person having ordinary skill in the art can derive other drawings from such accompanying drawings without any creative effort.

DETAILED DESCRIPTION OF THE EMBODIMENTS

The technical solution under the present invention is elaborated below with reference to accompanying drawings. Evidently, the embodiments described below are for the exemplary purpose only, without covering all embodiments of the present invention. Additionally, all other embodiments, which can be derived by those skilled in the art from the embodiments given herein without any creative efforts, fall within the scope of the present invention.

Embodiment 1

Figure 1:
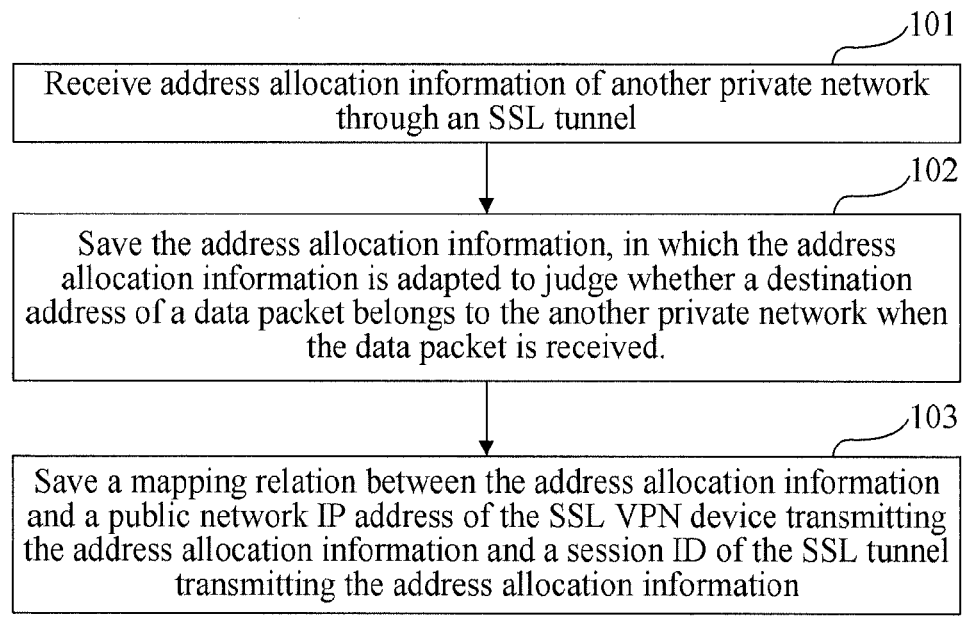
FIG. 1 is a flow chart of a method for sharing private network address allocation information according to Embodiment 1 of the present invention.

Referring to FIG. 1, in Embodiment 1, the present invention provides a method for sharing private network address allocation information. The method includes the following steps:

Step 101: An SSL VPN device of a private network receives address allocation information of another private network through an SSL tunnel.

The address allocation information is transmitted by an SSL VPN device of the another private network through the SSL tunnel.

Step 102: Save the address allocation information. The address allocation information is used to judge whether a destination address of a data packet belongs to the another private network when the data packet is received.

Step 103: Save a mapping relation between the address allocation information and a public network IP address of the SSL VPN device transmitting the address allocation information and a session ID of the SSL tunnel transmitting the address allocation information.

Embodiment 2

Figure 2:
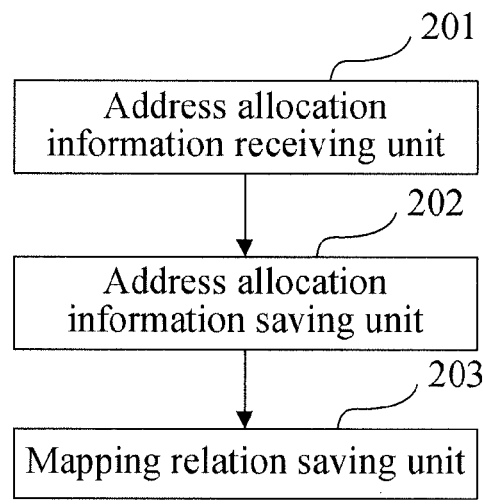
FIG. 2 is a structural view of an apparatus for sharing private network address allocation information according to Embodiment 2 of the present invention.

Based on the method according to Embodiment 1 of the present invention, in Embodiment 2, the present invention provides an apparatus for sharing private network address allocation information. As shown in FIG. 2, the apparatus includes an address allocation information receiving unit 201, an address allocation information saving unit 202, and a mapping relation saving unit 203.

The address allocation information receiving unit 201 is configured to enable an SSL VPN device of a private network to receive address allocation information of another private network through an SSL tunnel, in which the address allocation information is transmitted by an SSL VPN device in the another private network through the SSL tunnel.

The address allocation information saving unit 202 is configured to save the address allocation information, in which the address allocation information is used to judge whether a destination address of a data packet belongs to the another private network when the SSL VPN receives the data packet.

The mapping relation saving unit 203 is configured to save a mapping relation between the address allocation information and a public network IP address of the SSL VPN device transmitting the address allocation information and a session ID of the SSL tunnel transmitting the address allocation information.

The apparatus may be deployed on an existing SSL VPN device, so as to enable the SSL VPN device to obtain logical topologies of other private networks, that is, to resolve private network addresses of other private networks.

It can be seen from the embodiment that, an SSL VPN device of a private network receives address allocation information of another private network transmitted by an SSL VPN device in the another private network through an SSL tunnel, and the address allocation information is saved, so that the SSL VPN device of the private network obtains the allocation information of a private address of the another private network. Thus, it can be judged whether a destination address of a data packet belongs to the another private network according to the address allocation information when the data packet is received. Therefore, an SSL VPN device of a private network is enabled to resolve private network addresses of other private networks.

Embodiment 3

Figure 3:
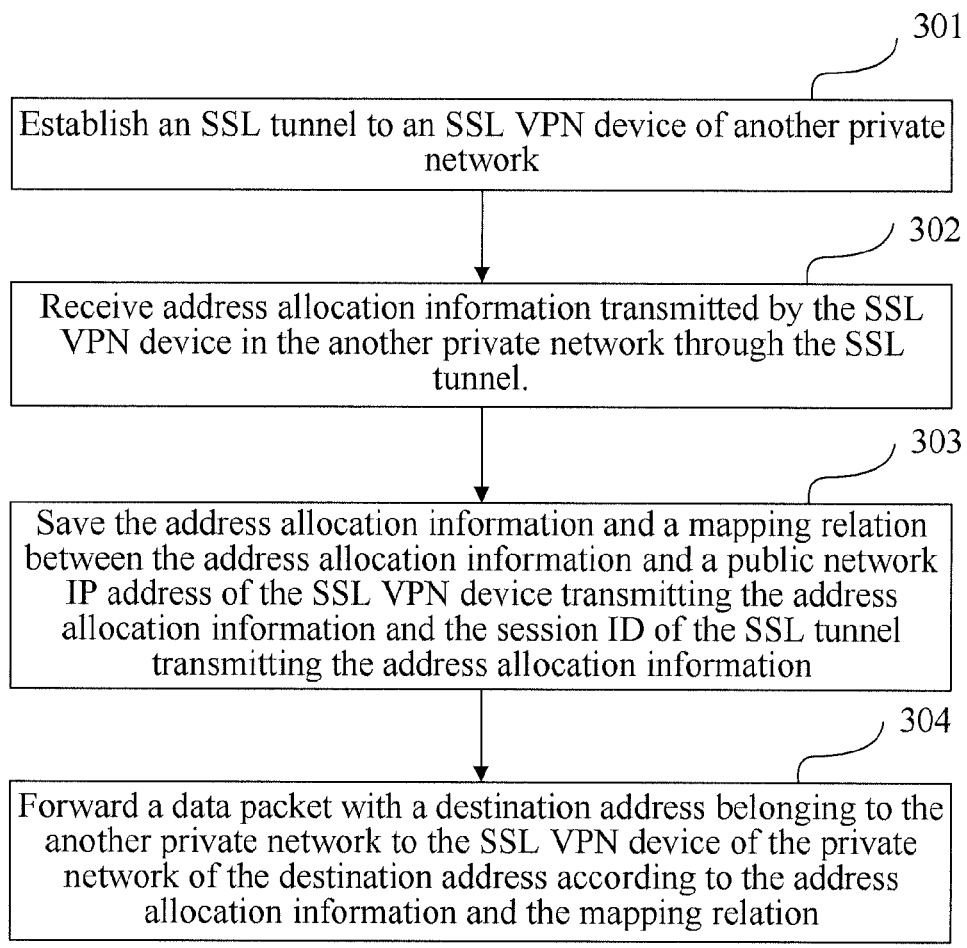
FIG. 3 is a flow chart of a method for forwarding data between private networks according to Embodiment 3 of the present invention.

As shown in FIG. 3, in Embodiment 3, the present invention provides a method for forwarding data between private networks. The method includes the following steps.

Step 301: Establish an SSL tunnel between an SSL VPN device of a private network and an SSL VPN device of another private network.

In this step, the established SSL tunnel corresponds to a session ID. The session ID is used to identify an established SSL connection uniquely. In a case when multiple SSL connections exit and multiple SSL tunnels are established between the SSL VPN devices, a session ID is used to determine which SSL tunnel is to be used for transmission when data is forwarded between the SSL VPN devices through a public network.

Step 302: Receive address allocation information of the another private network through the SSL tunnel. The address allocation information is transmitted by the SSL VPN device in the another private network through the SSL tunnel.

This step also includes requesting the address allocation information of the another private network through the SSL tunnel.

Step 303: Save the address allocation information and a mapping relation between the address allocation information and a public network IP address of the SSL VPN device transmitting the address allocation information and the session ID of the SSL tunnel transmitting the address allocation information.

Step 304: Forward a data packet whose destination address belongs to the another private network to the SSL VPN device of the private network to which the destination address belongs, according to the address allocation information and the mapping relation.

Figure 4:
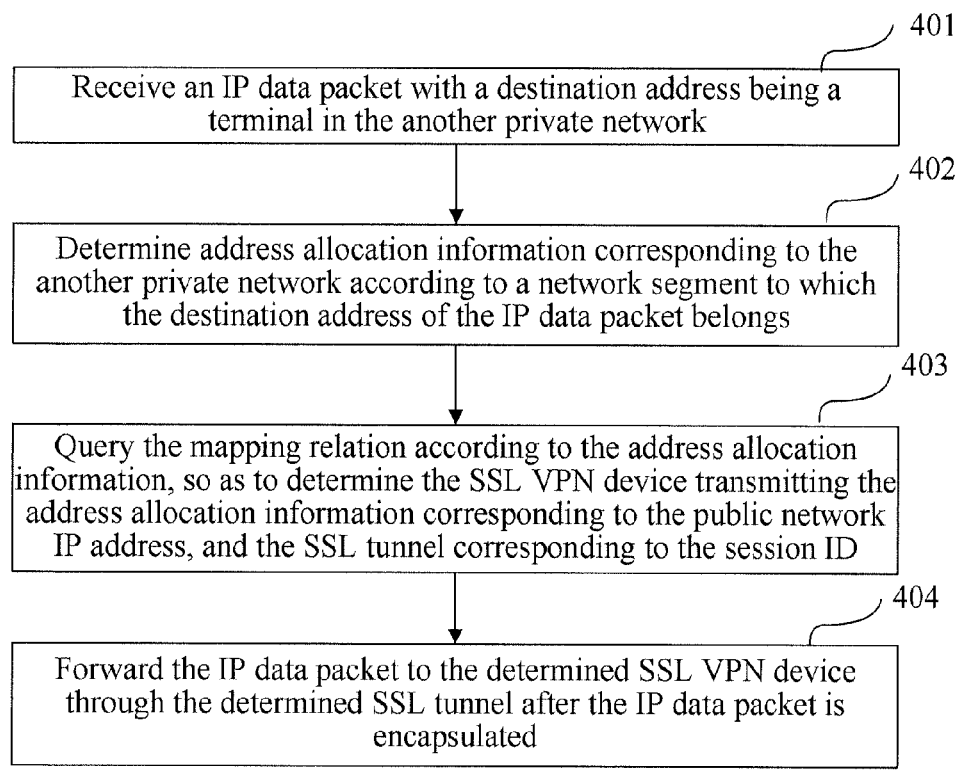
FIG. 4 is flow chart of a data forwarding operation of an SSL VPN device according to Embodiment 3 of the present invention.

As shown in FIG. 4, this step includes the following steps:

Step 401: Receive an IP data packet whose destination address corresponds to a terminal in the another private network.

Because the destination address is the terminal in the another private network, the IP data packet is first sent to the SSL VPN device of the current private network.

Step 402: Determine the address allocation information of the another private network according to a network segment to which the destination address of the IP data packet belongs.

After receiving the IP data packet, the SSL VPN device of the current private network judges the network segment of the destination address, so as to determine the address allocation information of the private network to which the IP data packet should be sent.

Step 403: Query the mapping relation according to the address allocation information, so as to determine the SSL VPN device transmitting the address allocation information of the public network IP address, and the SSL tunnel corresponding to the session ID.

When the mapping relation is queried, a mapping relation between the address allocation information and the public network IP address of the SSL VPN device transmitting the address allocation information, and a mapping relation between the address allocation information and the session ID of the SSL tunnel transmitting the address allocation information are queried to determine the SSL VPN device to which and the SSL tunnel through which the IP data packet is sent.

Figure 5:
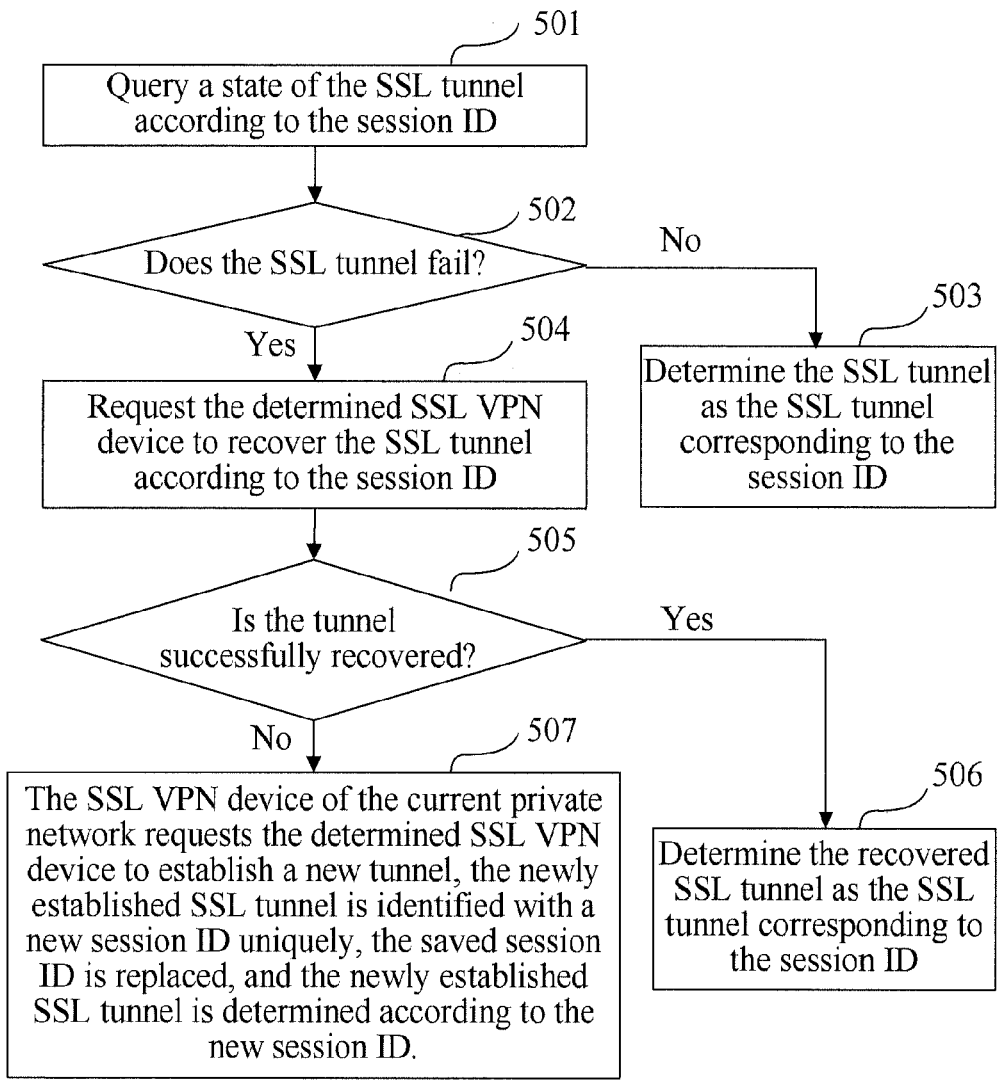
FIG. 5 is a flow chart of an operation of determining an SSL tunnel corresponding to a session ID according to Embodiment 3 of the present invention.

The step of determining the SSL tunnel corresponding to the session ID, as shown in FIG. 5, includes the following steps:

Step 501: Query a state of the SSL tunnel according to the session ID.

Step 502: Judge whether the SSL tunnel fails.

Step 503: Determine the SSL tunnel as the SSL tunnel corresponding to the session ID if the SSL tunnel is available.

Step 504: Request the determined SSL VPN device to recover the SSL tunnel according to the session ID if the SSL tunnel fails.

Step 505: Judge whether the SSL tunnel is successfully recovered d.

Step 506: Determine the recovered SSL tunnel as the SSL tunnel corresponding to the session ID if the recovery is successful.

Step 507: If the recovery fails, the SSL VPN device of the current private network requests the determined SSL VPN device to establish a new tunnel, the newly established SSL tunnel is uniquely identified by using a new session ID, the saved session ID is replaced, and the newly established SSL tunnel is determined according to the new session ID.

Through the preceding steps, it is ensured that an available SSL tunnel is obtained by query, and after being encapsulated, the IP data packet is forwarded to the SSL VPN device through the SSL tunnel determined in the preceding steps, thereby realizing data forwarding between the SSL VPN devices.

When data is transmitted between SSL VPN devices through an SSL tunnel established in a public network, to guarantee the security of data transmission, the IP data packet is required to be encapsulated and decapsulated. The process includes the following steps: authenticating a user and a server, so as to ensure that data is sent to the right client and server; encrypting the data in case the data is intercepted; and maintaining the integrity of the data, so as to ensure that the data is not changed during transmission.

After an SSL VPN device of a private network of a destination address receives a data packet forwarded by an SSL VPN device of another private network through an SSL tunnel, an IP data packet is obtained by decapsulation. It is judged whether a network segment of the destination address of the IP data packet and a network segment of the current private network belong to the same network segment. If yes, the data packet is forwarded to the destination address in an internal network after a layer 2 header of the IP data packet is re-encapsulated. If not, the SSL VPN device of the current private network searches for saved address allocation information of other private networks and a mapping relation, and forwards the data packet with the destination address belonging to another private network to the SSL VPN device of the private network to which the destination address belongs.

For a data packet of a terminal of a destination address in response to a terminal of a source address, the address of the source terminal is used as the destination address, and this destination address is used as the source address. The process of data forwarding is the same as the step 304.

In a case when multiple private networks and multiple SSL VPN devices exist, the step for terminals in each two private networks to communicate with each other by using private network addresses are the same as step 304.

Embodiment 4

Figure 6:
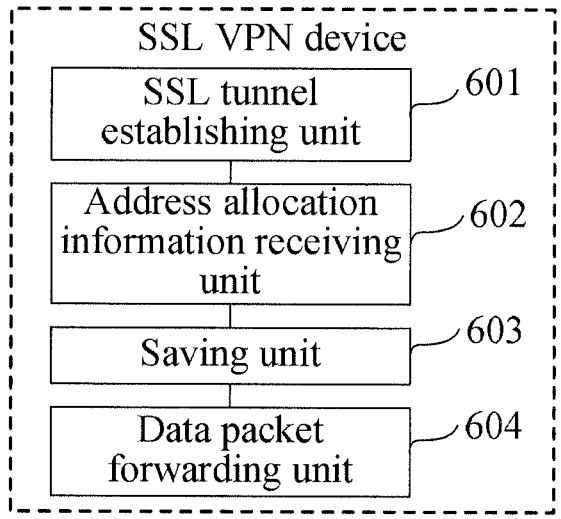
FIG. 6 is a structural view of each SSL VPN device in a system for forwarding data between private networks according to Embodiment 4 of the present invention.

Based on the method for forwarding data between private networks according to Embodiment 3 of the present invention, as shown in FIG. 6, in Embodiment 4, the present invention provides a system for forwarding data between private networks. The system includes two or more private networks. Each of the private networks accesses a public network through an SSL VPN device allocated with a public network IP address respectively. Each of the SSL VPN devices includes an SSL tunnel establishing unit 601, an address allocation information receiving unit 602, a saving unit 603, and a data packet forwarding unit 604.

The SSL tunnel establishing unit 601 is configured to establish an SSL tunnel to an SSL VPN device in another private network.

The SSL tunnel corresponds to a session ID. The session ID is used to identify an established SSL connection uniquely. In a case when multiple SSL connections exit and multiple SSL tunnels are established between the SSL VPN devices, a session ID is used to determine which SSL tunnel is to be used for transmission when data is forwarded between the SSL VPN devices through a public network.

The address allocation information receiving unit 602 is configured to receive address allocation information of the another private network through the SSL tunnel, in which the address allocation information is transmitted by the SSL VPN device in the another private network through the SSL tunnel.

The saving unit 603 is configured to save the address allocation information and a mapping relation between the address allocation information and the public network IP address of the SSL VPN device transmitting the address allocation information and the session ID of the SSL tunnel transmitting the address allocation information.

The data packet forwarding unit 604 is configured to forward a data packet whose destination address belongs to the another private network to the SSL VPN device of the private network to which the destination address belongs, according to the address allocation information and the mapping relation.

Figure 7:
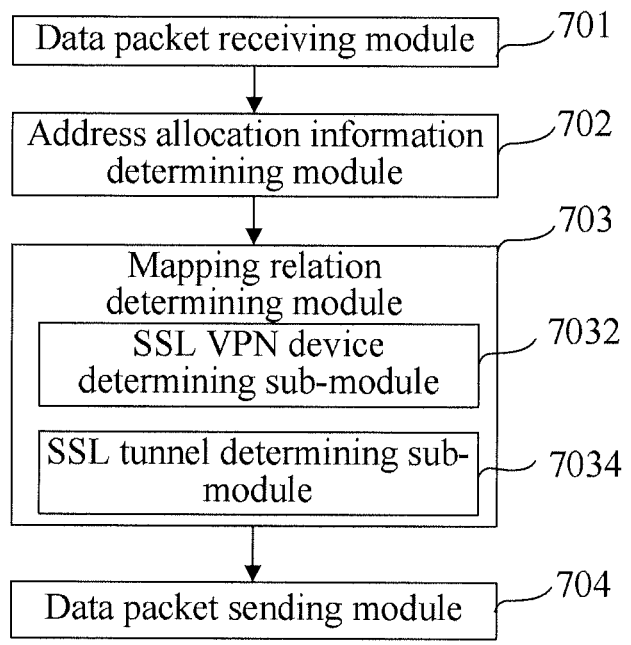
FIG. 7 is a structural view of a data packet forwarding unit according to Embodiment 4 of the present invention.

As shown in FIG. 7, the data packet forwarding unit 604 includes a data packet receiving module 701, an address allocation information determining module 702, a mapping relation determining module 703, and a data packet sending module 704.

The data packet receiving module 701 is configured to receive an IP data packet whose destination address corresponds to a terminal in the another private network.

The address allocation information determining module 702 is configured to determine the address allocation information of the another private network according to a network segment to which the destination address of the IP data packet belongs.

The mapping relation determining module 703 is configured to query the mapping relation according to the address allocation information, so as to determine the SSL VPN device transmitting the address allocation information of the public network IP address, and the SSL tunnel corresponding to the session ID.

The mapping relation determining module 703 includes an SSL VPN device determining sub-module 7032 and an SSL tunnel determining sub-module 7034.

The SSL VPN device determining sub-module 7032 is configured to query the mapping relation according to the address allocation information, so as to determine the SSL VPN device transmitting the address allocation information of the public network IP address.

The SSL tunnel determining sub-module 7034 is configured to query the mapping relation according to the address allocation information, so as to determine the SSL tunnel corresponding to the session ID. The sub-module 7034 first queries a state of the SSL tunnel according to the session ID. If the SSL tunnel is available, the SSL tunnel is determined as the SSL tunnel corresponding to the session ID. If the SSL tunnel fails, the determined SSL VPN device is requested to recover the SSL tunnel according to the session ID, and the recovered SSL tunnel is determined as the SSL tunnel corresponding to the session ID. If the recovery fails, the SSL VPN device of the current private network requests the determined SSL VPN device to establish a new tunnel, the newly established SSL tunnel is uniquely identified by using a new session ID, the saved session ID is replaced; and the newly established SSL tunnel is determined according to the new session ID.

The SSL tunnel determining sub-module 7034 can ensure that an available SSL tunnel is obtained by query, and after being encapsulated, the IP data packet is forwarded to the SSL VPN device through the SSL tunnel determined in the preceding steps, thereby realizing data forwarding between the SSL VPN devices.

The data packet sending module 704 is configured to send the IP data packet to the SSL VPN device through the SSL tunnel after the IP data packet is encapsulated.

It can be seen from the preceding technical solutions that, an SSL tunnel is established between an SSL VPN device in a private network and an SSL VPN device in another private network, address allocation information of the another private network is received, and the address allocation information is saved, so that an SSL VPN device of a private network obtains the allocation information of a private address of the another private network. A mapping relation between the address allocation information and the public network IP address of the SSL VPN device transmitting the address allocation information and a session ID of the SSL tunnel transmitting the address allocation information is saved. For a data packet transmitted to a terminal in the another private network by using a private address, the mapping relation is queried through the address allocation information to obtain the SSL VPN device corresponding to the public network IP address and the SSL tunnel corresponding to the session ID. Thus, the data packet can be forwarded to the SSL VPN device obtained by query. Therefore, terminals in different private networks are enabled to securely communicate with each other by using private network addresses.

Embodiment 5

Figure 8:
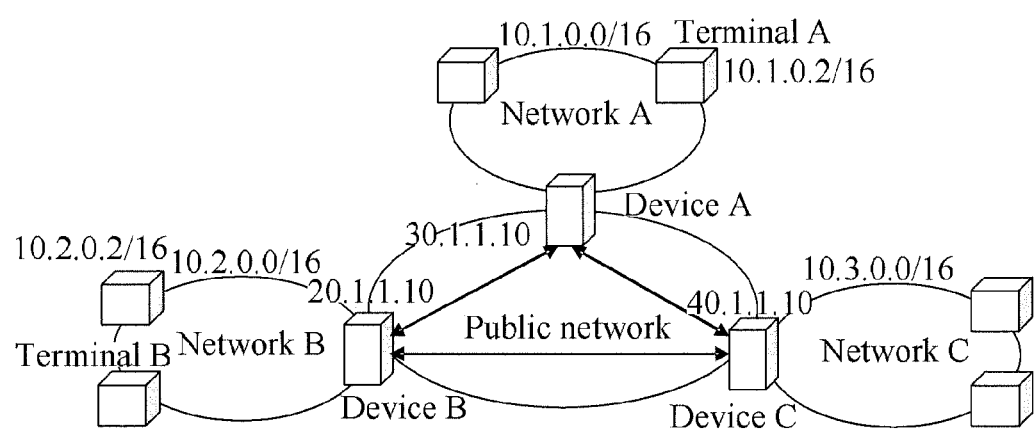
FIG. 8 is a schematic network diagram of a specific embodiment according to Embodiment 5 of the present invention.

The technical solutions provided by the present invention are described in the following through a specific embodiment. FIG. 8 is a schematic network diagram of communication between private networks according to Embodiment 5 of the present invention.

In this embodiment, a private network address 10.0.0.0/8 is used inside an overall institution network. The private network address is allocated in a uniform way. Three branch networks are included: Branch Network A (referred to as Network A) allocated with an IP address segment 10.1.0.0/16, Branch Network B (referred to as Network B) allocated with an IP address segment 10.2.0.0/16, and Branch Network C (referred to as Network C) allocated with an IP address segment 10.3.0.0/16. An SSL VPN device is deployed at the edge between each of the branch networks and a public network respectively. The devices have public network IP addresses routable in the public network: the public network IP address of the SSL VPN device in Network A (referred to as Device A) is 20.1.1.10; the public network IP address of the SSL VPN device in Network B (referred to as Device B) is 30.1.1.10; and the public network IP address of the SSL VPN device in Network C (referred to as Device C) is 40.1.1.10. SSL tunnels are established between the SSL VPN devices to transmit communication data between the branch networks.

When a terminal with an IP address being 10.1.0.2/16 in Network A (referred to as Terminal A) needs to communicate with a terminal with an IP address being 10.2.0.2/16 in Network B (referred to as Terminal B), the following communication steps are required:

Step 1: An SSL site-to-site tunnel is established between an SSL VPN device in Network A (Device A) and an SSL VPN device in Network B (Device B), and the tunnel corresponds to a session ID uniquely.

Step 2: Device A receives address allocation information of Network B, that is 10.2.0.0/16, sent by Device B through the SSL tunnel. Device A records the address allocation information, and is bound to the source address transmitting the address allocation information (that is, the public network IP address 30.1.1.10 of Device B) and the session ID of the SSL tunnel transmitting the address allocation information, and saves a mapping relation between the address allocation information of Network B and the public network IP address of Device B and the session ID.

Step 3: Device B receives address allocation information of Network A, that is 10.1.0.0/16, sent by Device A through the SSL tunnel. Device B records the address allocation information, and is bound to the source address transmitting the address allocation information (that is, the public network IP address 20.1.1.10 of Device A) and the session ID of the SSL tunnel transmitting the address allocation information, and saves a mapping relation between the address allocation information of Network A and the public network IP address of Device A and the session ID.

Step 2 and step 3 may be executed at the same time.

Step 4: Terminal A communicates with Terminal B. An IP data packet whose destination address corresponds to the address of Terminal B (10.2.0.2/16) and source address corresponds to the address of Terminal A (10.1.0.2/16) is sent by Terminal A. Because the destination address does not belong to Network A, the data packet is sent to Device A.

Step 5: After receiving the IP data packet, Device A judges the destination address 10.2.0.2/16, finds that the destination address belongs to the network segment 10.2.0.0/16, learns that the network segment corresponds to Device B with the public network IP address being 30.1.1.10 by querying the mapping relation saved in step 2, and determines the SSL tunnel through which Device A and Device B perform communication according to the session ID in the saved mapping relation. Therefore, Device A encapsulates the IP data packet as a load, and transmits the IP data packet to Device B through the SSL tunnel between Device A and Device B.

When the SSL tunnel through which Device A and Device B perform communication is determined according to the session ID in the saved mapping relation, a state of the SSL tunnel is queried first according to the session ID. If the SSL tunnel is available, the SSL tunnel is determined. If the SSL tunnel fails, Device B is requested to recover the SSL tunnel according to the session ID. If the recovery fails, Device A requests Device B to establish a new tunnel, the newly established SSL tunnel is uniquely identified by using a new session ID, the saved session ID is replaced, and the newly established SSL tunnel is determined according to the new session ID.

6. Device B receives the data packet transmitted by Device A from the SSL connection, obtains the IP data packet by decapsulation, and judges whether the network segment of the destination address 20.1.0.2 and the network segment of the branch connected to Device B belong to the same network segment, and if yes, forwards the data packet to the internal network after a layer 2 header of the IP data packet is re-encapsulated.

7. A data packet of Terminal B in response to Terminal A uses the address of Terminal A (10.1.0.2) as a destination address and the address of Terminal B (10.2.0.2) as a source address. Therefore, the process of transmitting the response data packet is similar to steps 4, 5 and 6.

Furthermore, steps of communication between terminals in Network A and Network C, and Network B and Network C are the same as the preceding steps.

It should be understood that, the method and apparatus for sharing private network address allocation information and the method and system for forwarding data between private networks provided by the present invention are described above in detail, and can be widely applied in an overall institution network formed by multiple geographically or logically separated branch networks interconnected through a public network by using private network addresses that are allocated in a uniform way, so that a terminal in each branch can communicate with terminals in other branches in a secure and convenient way by using the allocated private addresses.

Persons of ordinary skill in the art may understand that all or part of the steps of the method according to the embodiments of the present invention may be implemented by a program instructing relevant hardware. The program may be stored in a computer readable storage medium. When the program is run, the procedures of the embodiments of the preceding methods may be included. The storage medium may be a magnetic disk, a Compact Disk Read-Only Memory (CD-ROM), a Read-Only Memory (ROM) or a Random Access Memory (RAM).

In addition, the functional units in the embodiments of the present invention may be integrated in one processing module or may each be an independent physical entity, or two or more units are integrated in one module. The integrated module may be accomplished through hardware or a software functional module. If the integrated module is accomplished through the software functional module and is sold or used as a separate product, the integrated module may be stored in a computer readable storage medium. The storage medium may be a Read-Only Memory (ROM), a magnetic disk or a Compact Disk Read-Only Memory (CD-ROM).

The preceding descriptions are merely preferred embodiments of the present invention, but not intended to limit the present invention. Person having ordinary skill in the art may make various improvements and refinements without departing from the principle of the invention. All such modifications and refinements are intended to be covered by the present invention.

What is claimed is:

1. A method for sharing private network addresses allocation information, comprising:
 receiving address allocation information of another private network through a Secure Socket Layer (SSL) tunnel;
 saving the address allocation information, wherein the address allocation information is used to judge whether a destination address of a data packet belongs to the another private network when the data packet is received; and
 forwarding a data packet whose destination address belongs to the another private network to an SSL Virtual Private Network (VPN) device of the another private network to which the destination address belongs over the SSL tunnel with a session ID transmitting the address allocation information, according to the address allocation information and a mapping relation between the address allocation information and a public network Internet Protocol (IP) address of the SSL VPN device transmitting the address allocation information and the session ID of the SSL tunnel transmitting the address allocation information,
 wherein if the SSL tunnel fails, requesting the SSL VPN device to recover the SSL tunnel according to the session ID.

2. A method for forwarding data between private networks, comprising:
 establishing a Secure Socket Layer (SSL) tunnel to an SSL Virtual Private Network (VPN) device in another private network;
 receiving address allocation information of the another private network through the SSL tunnel, wherein the address allocation information is transmitted by the SSL VPN device in the another private network through the SSL tunnel;
 saving the address allocation information and a mapping relation between the address allocation information and a public network Internet Protocol (IP) address of the SSL VPN device transmitting the address allocation information and a session ID of the SSL tunnel transmitting the address allocation information; and
 forwarding a data packet whose destination address belongs to the another private network to the SSL VPN device of the another private network to which the destination address belongs, according to the address allocation information and the mapping relation over the SSL tunnel corresponding to the session ID
 wherein if the SSL tunnel fails, requesting the SSL VPN device to recover the SSL tunnel according to the session ID.

3. The method for forwarding data between private networks according to claim 2, wherein the forwarding the data packet with the destination address belonging to the another private network to the SSL VPN device of the private network to which the destination address belongs, according to the address allocation information and the mapping relation comprises:
 receiving an IP data packet whose destination address corresponds to a terminal in the another private network;
 determining the address allocation information of the another private network according to a network segment to which the destination address of the IP data packet belongs;
 querying the mapping relation according to the address allocation information, so as to determine the SSL VPN device transmitting the address allocation information of the public network IP address, and the SSL tunnel corresponding to the session ID; and
 forwarding the IP data packet to the determined SSL VPN device through the determined SSL tunnel after the IP data packet is encapsulated.

4. The method for forwarding data between private networks according to claim 3, wherein determining an SSL tunnel corresponding to the session ID comprises:
 querying a state of an SSL tunnel according to the session ID;
 determining the SSL tunnel as the SSL tunnel corresponding to the session ID if the SSL tunnel is available;
 determining the recovered SSL tunnel as the SSL tunnel corresponding to the session ID; and
 requesting, by an SSL VPN device of the current private network, the determined SSL VPN device to establish a new tunnel if the recovery fails, uniquely identifying the newly established SSL tunnel by using a new session ID, replacing the saved session ID, and determining the newly established SSL tunnel according to the new session ID.

5. A system for forwarding data between private networks, comprising two or more private networks, wherein each of the private networks accesses a public network through a Secure Socket Layer (SSL) Virtual Private Network (VPN) device allocated with a public network Internet Protocol (IP) address respectively, and each of the SSL VPN devices comprises:
 an SSL tunnel establishing unit, configured to establish an SSL tunnel to an SSL VPN device in another private network;
 an address allocation information receiving unit, configured to receive address allocation information of the another private network through the SSL tunnel established by the SSL tunnel establishing unit, wherein the address allocation information is transmitted by the SSL VPN device in the another private network through the SSL tunnel;
 a saving unit, configured to save the address allocation information received by the address allocation information receiving unit and a mapping relation between the address allocation information and the public network IP address of the SSL VPN device transmitting the address allocation information and a session ID of the SSL tunnel transmitting the address allocation information; and a data packet forwarding unit, configured to forward a data packet whose destination address belongs to the another private network to the SSL VPN device of the another private network to which the destination address belongs over the SSL tunnel corresponding to the session ID, according to the address allocation information and the mapping relation saved by the saving unit, wherein if the SSL tunnel fails, requesting the SSL VPN device to recover the SSL tunnel according to the session ID.

6. The system for forwarding data between private networks according to claim 5, wherein the data packet forwarding unit comprises:

a data packet receiving module, configured to receive an IP data packet whose destination address corresponds to a terminal in the another private network;

an address allocation information determining module, configured to determine the address allocation information of the another private network according to a network segment to which the destination address of the IP data packet belongs;

a mapping relation determining module, configured to query the mapping relation according to the address allocation information, so as to determine the SSL VPN device transmitting the address allocation information of the public network IP address, and the SSL tunnel corresponding to the session ID; and a data packet sending module, configured to forward the IP data packet to the determined SSL VPN device through the determined SSL tunnel after the IP data packet is encapsulated.

7. The system for forwarding data between private networks according to claim 6, wherein the mapping relation determining module comprises:

an SSL VPN device determining sub-module, configured to query the mapping relation according to the address allocation information, so as to determine the SSL VPN device transmitting the address allocation information of the public network IP address; and an SSL tunnel determining sub-module, configured to query the mapping relation according to the address allocation information, so as to determine the SSL tunnel corresponding to the session ID; wherein the SSL tunnel determining sub-module first queries a state of the SSL tunnel according to the session ID, if the SSL tunnel is available, the SSL tunnel is determined as the SSL tunnel corresponding to the session ID; the recovered SSL tunnel is determined as the SSL tunnel corresponding to the session ID; if the recovery fails, the SSL VPN device of the current private network requests the determined SSL VPN device to establish a new tunnel, the newly established SSL tunnel is uniquely identified by using a new session ID, the saved session ID is replaced; and the newly established SSL tunnel is determined according to the new session ID.

* * * * *